(12) United States Patent
Quintero

(10) Patent No.: US 10,408,038 B2
(45) Date of Patent: *Sep. 10, 2019

(54) MULTI-SENSOR WORKFLOW FOR EVALUATION OF WATER FLOW IN MULTIPLE CASING STRINGS WITH DISTRIBUTED SENSORS DATA

(71) Applicant: Halliburton Energy Services, Inc., Houston, TX (US)

(72) Inventor: Luis F. Quintero, Katy, TX (US)

(73) Assignee: Halliburton Energy Services, Inc., Houston, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 15/805,006

(22) Filed: Nov. 6, 2017

(65) Prior Publication Data

US 2018/0058189 A1    Mar. 1, 2018

Related U.S. Application Data

(63) Continuation of application No. 14/907,600, filed as application No. PCT/US2015/048464 on Sep. 4, 2015, now Pat. No. 9,835,022.
(Continued)

(51) Int. Cl.
*G01V 5/10* (2006.01)
*E21B 47/00* (2012.01)
(Continued)

(52) U.S. Cl.
CPC .......... *E21B 47/0005* (2013.01); *E21B 33/14* (2013.01); *E21B 47/00* (2013.01);
(Continued)

(58) Field of Classification Search
CPC .......... E21B 47/00; E21B 47/10; E21B 47/01; E21B 47/09; E21B 47/0005; E21B 33/14;
(Continued)

(56) References Cited

U.S. PATENT DOCUMENTS 3,815,677 A    6/1974    Pennebaker, Jr.
4,032,781 A    6/1977    Arnold
(Continued)

FOREIGN PATENT DOCUMENTS

WO    2011127156 A2    10/2011

OTHER PUBLICATIONS

Extended European Search Report from European Patent Application No. 15840559.7, dated Feb. 28, 2018, 5 pages.
(Continued)

*Primary Examiner* — David P Porta
*Assistant Examiner* — Meenakshi S Sahu
(74) *Attorney, Agent, or Firm* — Benjamin Fite; C. Tumey Law Group PLLC

(57) ABSTRACT

A distance of a water flow path and a velocity of the water flow are calculated using data obtained from both a pulsed neutron sensor and distributed acoustic sensors. The two distance and velocity values are compared to obtain a first calculated distance and velocity. The distance of the water flow path and the velocity of the water flow are calculated using the Doppler data obtained from distributed Doppler sensors. The distance and velocity values are compared with the first calculated distance and first calculated velocity to obtain a second calculated distance and velocity values. The distance of the water flow path and the velocity of the water flow are calculated using temperature data obtained from distributed temperature sensors. The distance and velocity values are compared with the second calculated distance and velocity to determine a distance of a cement interface, and a velocity of a water flow therein.

23 Claims, 8 Drawing Sheets

Related U.S. Application Data

(60) Provisional application No. 62/048,501, filed on Sep. 10, 2014.

(51) Int. Cl.

| | | |
|---|---|---|
| *G01V 11/00* | (2006.01) | |
| *G01V 1/22* | (2006.01) | |
| *E21B 47/06* | (2012.01) | |
| *E21B 47/12* | (2012.01) | |
| *E21B 33/14* | (2006.01) | |
| *G01V 99/00* | (2009.01) | |
| *G06F 17/50* | (2006.01) | |
| *G01V 1/46* | (2006.01) | |
| *G01V 1/50* | (2006.01) | |

(52) U.S. Cl.
CPC .......... *E21B 47/065* (2013.01); *E21B 47/123* (2013.01); *G01V 1/226* (2013.01); *G01V 5/10* (2013.01); *G01V 5/101* (2013.01); *G01V 5/102* (2013.01); *G01V 11/00* (2013.01); *G01V 99/005* (2013.01); *G06F 17/5009* (2013.01); *G01V 1/46* (2013.01); *G01V 1/50* (2013.01); *G01V 2210/1299* (2013.01); *G01V 2210/1429* (2013.01); *G06F 2217/16* (2013.01)

(58) Field of Classification Search
CPC ....... E21B 47/123; E21B 47/065; G01V 5/04; G01V 1/40; G01V 11/00; G01V 5/10; G01V 2210/1429; G01V 2210/1299; G01V 1/50; G01V 1/46; G01V 5/102; G01V 99/005; G01V 5/101; G01V 1/226; G06F 2217/16; G06F 17/5009
USPC ...................................................... 250/269.2
See application file for complete search history.

(56) References Cited

U.S. PATENT DOCUMENTS

| | | |
|---|---|---|
| 4,092,536 A | 5/1978 | Smith |
| 5,001,342 A | 3/1991 | Rambow |
| 5,089,989 A | 2/1992 | Schmidt |
| 5,274,604 A | 12/1993 | D'Angelo |
| 5,461,909 A | 10/1995 | Arnold |
| 6,173,606 B1 | 1/2001 | Mosley |
| 7,128,148 B2 | 10/2006 | Eoff et al. |
| 9,547,105 B2 | 1/2017 | Quintero |
| 9,784,884 B2 * | 10/2017 | Quintero ................ G01V 1/226 |
| 2003/0009288 A1 | 1/2003 | Mickael |
| 2004/0210393 A1 | 10/2004 | Ellis et al. |
| 2008/0087423 A1 | 4/2008 | Wylie et al. |
| 2009/0044617 A1 | 2/2009 | DiFoggio |
| 2009/0225949 A1 | 9/2009 | Wraight et al. |
| 2010/0226206 A1 | 9/2010 | Al-Khamis |
| 2010/0258303 A1 | 10/2010 | Alberty |
| 2011/0192598 A1 | 8/2011 | Roddy et al. |
| 2012/0155508 A1 | 6/2012 | Dria et al. |
| 2013/0075091 A1 * | 3/2013 | Hallundbæk ........... E21B 47/01 166/250.15 |
| 2013/0233538 A1 | 9/2013 | Chatterji et al. |
| 2014/0052376 A1 | 2/2014 | Guo et al. |
| 2016/0202387 A1 * | 7/2016 | Fox ..................... E21B 47/0005 73/152.58 |
| 2016/0274260 A1 | 9/2016 | Quintero et al. |
| 2016/0334540 A1 | 11/2016 | Quintero et al. |
| 2017/0123105 A1 | 5/2017 | Quintero |

OTHER PUBLICATIONS

International Search Report and Written Opinion for PCT/US2015/048464 dated Nov. 23, 2015.

Stalford et al., Intelligent Casing-Intelligent Formation (ICIF) Design, May 5-8, 2014,, OTC 25161-MS, Offshore Technology Conference, Houston, Texas, 9 pp.

Boone et al., Detecting Leaks in Abandoned Gas Wells with Fibre-Optic Distributed Acoustic Sensing, Jan. 20-22, 2014. IPTC 17530, International Petroleum Technology Conference, Doha, Qatar, 8 pp.

* cited by examiner

MULTI-SENSOR WORKFLOW FOR EVALUATION OF WATER FLOW IN MULTIPLE CASING STRINGS WITH DISTRIBUTED SENSORS DATA

CROSS-REFERENCE TO RELATED APPLICATIONS

This application is a continuation of U.S. patent application Ser. No. 14/907,600 entitled "MULTI-SENSOR WORKFLOW FOR EVALUATION OF WATER FLOW IN MULTIPLE CASING STRINGS WITH DISTRIBUTED SENSORS DATA," filed on Jan. 26, 2016, which is a National Stage entry of International Application No. PCT/US2015/048464, entitled "MULTI-SENSOR WORKFLOW FOR EVALUATION OF WATER FLOW IN MULTIPLE CASING STRINGS WITH DISTRIBUTED SENSORS DATA," filed on Sep. 4, 2015, which claims priority under to Provisional Application No. 62/048,501 entitled "MULTI-SENSOR WORKFLOW FOR EVALUATION OF WATER FLOW IN MULTIPLE CASING STRINGS WITH DISTRIBUTED SENSORS DATA," filed on Sep. 10, 2014, in the United States Patent and Trademark Office.

BACKGROUND

Completing an oil or gas well includes a cementing procedure that bonds one or more well casings lining a wellbore to a surrounding subterranean formation and between each other. In the vast majority of cases, as the well deepens, new casing strings are needed and cemented in place. Many other factors can also indicate the need for multiple concentric or overlapping casing strings, such as compliance with environmental and safety policies. The cement between these casing strings generally prevents the presence or movement of fluids within the annular spaces defined between overlapping casings and between the casing and the wellbore wall. In some wells, the cementing process extends from total depth to surface, while in others the cement is present only between certain depths.

Of particular importance is the determination of the presence of fluid flow paths in the annular regions defined between overlapping casings and between the casing and the wellbore wall due to an absence of cement (or cement bond) at or between certain depths. The identification and characterization of these flow paths is particularly critical in the case of plug and abandonment operations, especially in deep water applications.

Sonic tools or ultrasonic tools are typically used in the industry to evaluate the cement bonding to both the formation and the casing and hence infer potential annular flow paths (i.e., leaks, channels, gaps, etc.). The evaluation in most of these cases uses raw data from only one system of sensors to infer fluid flow parameters through indirect methods. There is no current workflow method that integrates the various measurements obtained into a borehole model. Current methods are also typically used for the characterization of the first casing-cement bond, thereby precluding the evaluation of any subsequent interfaces in the case of multiple casing strings extended within the well.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

DETAILED DESCRIPTION

The present disclosure is related to the field of production of hydrocarbons from wellbores and, more particularly, to methods of evaluating annular flow of water between multiple casing strings that line a wellbore and between a wellbore wall and the casing strings.

The present disclosure describes integrated workflow methods that indicate the location and flow rate of water between overlapping sections of casings in a wellbore, and between the wellbore wall and the casing. The methods and systems described herein are applicable in wellbores lined with multiple casing strings and use a pulsed neutron sensor, distributed acoustic sensors (DAS), distributed Doppler sensors (DDS), and distributed temperature sensors (DTS). Embodiments of the present disclosure provide more direct and accurate measurements of cement bond quality and cement sheath characterization using the aforementioned sensors. The methods described herein help enhance the evaluation and characterization of cement sheaths without requiring investment in new tools, new tool hardware, or adaptations of existing tools.

Figure 1A:
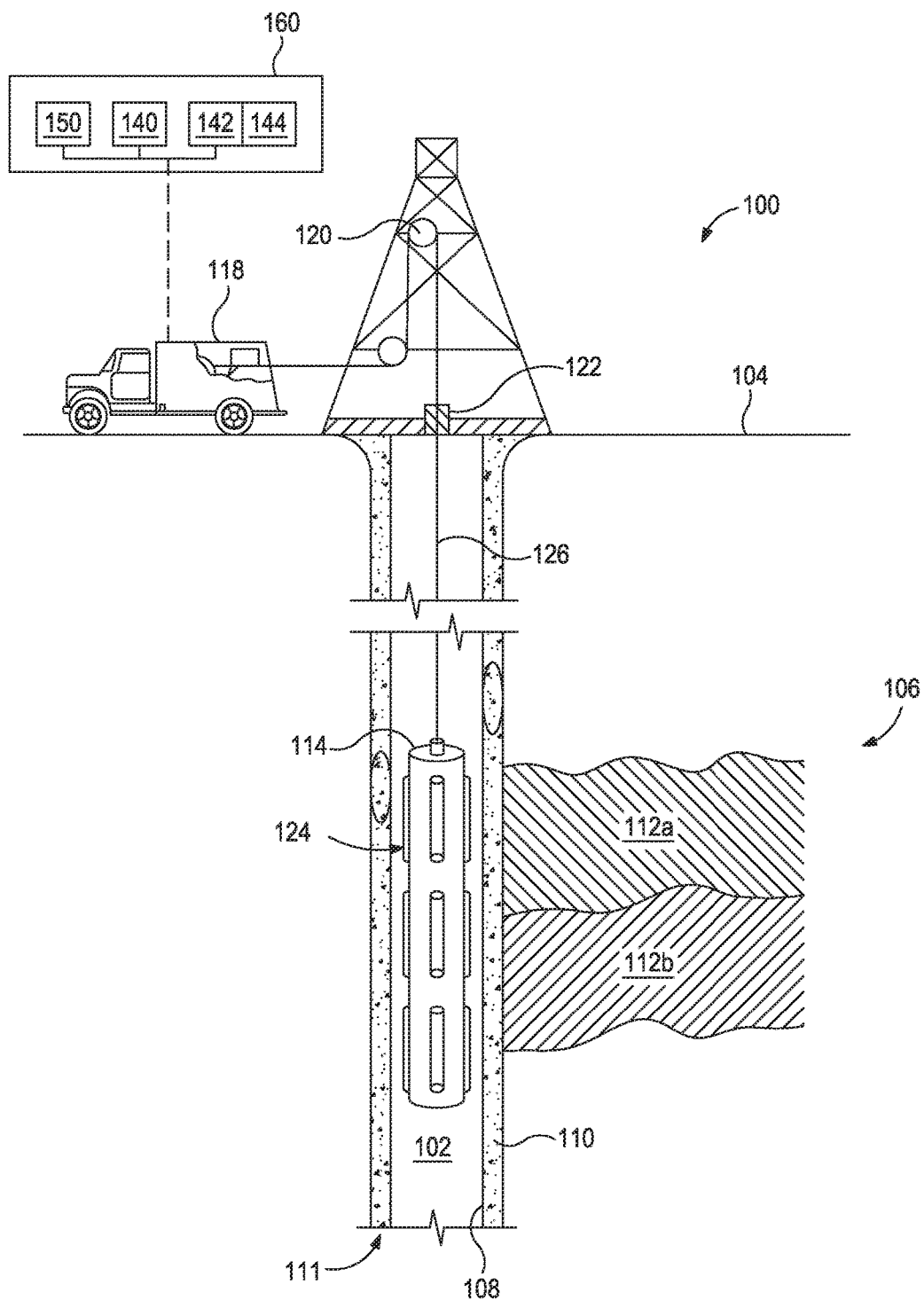
FIG. 1A is a well system that can employ the principles of the present disclosure.

FIG. 1A is an exemplary well system 100 that may employ the principles of the present disclosure. As illustrated, a wellbore 102 has been drilled from a surface location 104 into a subterranean formation 106 that may contain hydrocarbons. Set within the wellbore 102 is at least one string of casing 108 bonded to the inner wall of the wellbore 102 with cement 110. While not expressly shown, the casing 108 may comprise multiple strings of casing secured within the wellbore 102, where axially adjacent casings 108 overlap each other at least a short distance.

The casing 108 is bonded within the wellbore 102 by adding the cement 110 within an annulus 111 formed between the outer diameter of the casing 108 and the inner diameter of the wellbore 102. The resulting cement bond not only adheres the casing 108 within the wellbore 102, but also serves to isolate adjacent zones (112a and 112b) within the formation 106 from one another. Isolating the adjacent zones 112a,b can be important when one of the zones 112a,b contains oil or gas and the other zone includes a non-hydrocarbon fluid, such as water. Should the cement 110 surrounding the casing 108 be defective and fail to provide isolation of the adjacent zones 112a,b, water or other undesirable fluid can migrate into the hydrocarbon producing zone, thus diluting or contaminating the hydrocarbons within the producing zone. The cement 110 also serves to bond axially adjacent casings 108 that overlap each other a short distance.

To detect possible defective cement bonds between the casing 108 and the wellbore 102 and between overlapping lengths of casing 108, a tool string 114 may be introduced into the wellbore 102 on a conveyance such as a cable 126. In some embodiments, the cable 126 and the conveyance may comprise the same structure. In other embodiments, however, the conveyance and the cable 126 may not be the same and the cable 126 may instead be strung along the length of the conveyance, but not used to lower the tool string 114 into the wellbore 102. In yet other embodiments, the cable 126 may alternatively be attached to the outer surface of the casing 108 in the annulus 111. Other suitable conveyances can include, however, drill pipe, coiled tubing, a downhole tractor, production tubing, and the like. In some embodiments, the cable 126 may be connected to a surface processing unit 118, which is depicted in FIG. 1A as a truck via a pulley system 120 and fed into the wellbore 102 via a wellhead installation 122, such as a lubricator or the like.

The tool string 114 may include one or more logging tools or sensors such as, a pulsed neutron sensor 124, developed for analyzing the integrity of the cement 110 bonding the casing 108 to the wellbore 102 and/or to a portion of an overlapping casing (not shown). In some embodiments, the cable 126 may incorporate one or more optical fibers to obtain distributed and/or point measurements of one or more well parameters also for analyzing the integrity of the cement 110 bonding the casing 108 to the wellbore 102 and/or to a portion of an overlapping casing.

The cable 126 may be configured for optical fiber sensing to obtain point or distributed optical fiber measurements. As used herein, "distributed optical fiber sensing" refers to the ability to obtain well parameter measurements along the entire length of an optical fiber, but also refers to the ability to obtain point measurements from point reflectors (e.g., Fiber Bragg Gratings, etc.) included at predetermined locations along the optical fiber(s).

According to the embodiments of the present disclosure, the optical fibers in the cable 126 may be used as distributed acoustic sensors (DAS), distributed Doppler sensors (DDS), and/or distributed temperature sensors (DTS). In an example, one or more optical fibers may be used for each of DAS, DDS, and DTS.

A number of distributed optical fiber sensing methodologies may be used to determine the well parameters of interest, without departing from the scope of the present disclosure. When electromagnetic radiation is transmitted through an optical fiber, a portion of the electromagnetic radiation will be backscattered in the optical fiber by impurities of the optical fiber, areas of different refractive index in the fiber generated in the process of fabricating the fiber, interactions with the surfaces of the optical fiber, and/or connections between the fiber and other optical fibers or components. Some of the backscattered electromagnetic radiation is treated as unwanted noise and steps may be taken to reduce such backscattering.

DAS is typically based on coherent Rayleigh scattering where an optical fiber is optically coupled with (i.e. in optical communication with) a narrow-band electromagnetic radiation source, such as a narrow-band laser or the like. The laser may be used to produce short pulses of light that are launched into the optical fiber and a fraction of the backward scattered light that falls within the angular acceptance cone of the optical fiber in the return direction, i.e., towards the laser source, may be guided back to the launching end of the fiber as a backscattered signal. The backscattered signal may be used to provide information regarding the time varying state of strain along the optical fiber, which may be equated to locations where fluctuations in acoustic (vibration) is occurring. In the surface processing unit 118, a detector, such as an optoelectronic device may be in optical communication with the optical fiber and used to convert the backscattered electromagnetic signals to electrical signals, and a signal processor of the surface processing unit 118 may process the electrical signals to determine the magnitude of the strain assumed by the optical fiber downstream of the detector.

DTS is typically based on distributed Raman scattering to detect changes in temperature along the optical fiber. More specifically, fluctuations or changes in temperature can affect the glass fibers of an optical fiber and locally change the characteristics of light propagation in the optical fiber. Because of a temperature-dependent nonlinear process called Raman scattering, the location and magnitude of a temperature change can be determined so that the optical fiber can be used as a linear thermometer.

DDS functions based on the Doppler effect observed because of flowing fluid. An acoustic source located in the wellbore emits acoustic waves of different frequencies into the wellbore and the formation. The acoustic waves interact with fluid flowing in the wellbore and are attenuated. For instance, the higher frequency waves may be attenuated by fluid flowing closer to the optical fiber and lower frequency waves may be attenuated by fluid flowing further away from the optical fiber. The attenuated acoustic waves impinge upon an optical fiber positioned in the wellbore. The attenuated waves induce varying amount of strain in the optical fiber depending on the frequency. Interferometric techniques may be used to analyze the strain induced in the fiber and a location of the flowing fluid.

Figure 1B:
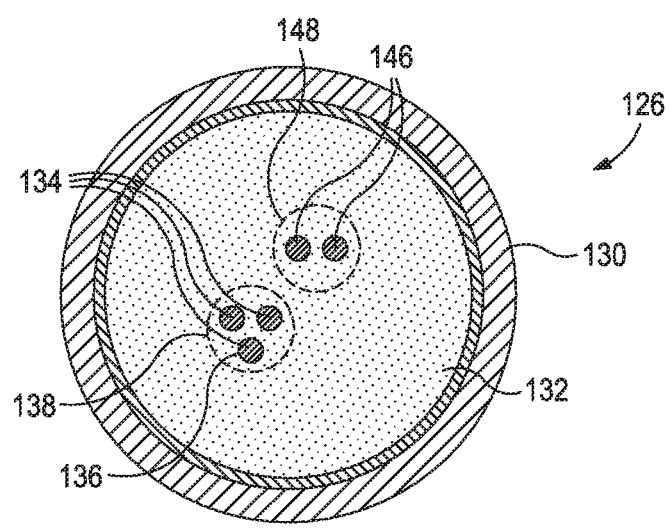
FIG. 1B is a cross-sectional end view of an exemplary cable.

FIG. 1B is a cross-sectional end view of an exemplary cable 126. The cable 126 may comprise a variety of types, sizes, and/or designs, each of which contains one or more optical fibers included and otherwise embedded therein. For example, the cable 126 may comprise a braided cable containing one or more optical fibers, or a hollow tube made of metal, plastic, or a composite and containing one or more optical fibers. The cable 126 may also include electrical conductors used for conveying data and/or power to the tool string 114. It will be appreciated, however, that additional types or designs of the cable 126 incorporating optical fibers may alternatively be employed. Accordingly, the types of cable 126 suitable for the present application should not be limited to those specifically mentioned herein.

In some embodiments, as illustrated, the cable 126 may include a sheath 130 disposed about a polymer composite 132. The sheath 130 acts as a protective coating for the polymer composite 132 to mitigate damage to the polymer composite 132 or components thereof during operation. In some instances, however, the sheath 130 may be excluded from the cable 126. The sheath 302 may be made of a metal material or another polymer with better performance with respect to properties including anti-wearing, hermetical sealing, and high mechanical strength. The polymer composite 132 may comprise a polymer matrix with a plurality of fibers embedded therein to provide desirable mechanical strength.

The cable 126 may further include one or more optical fibers 134 (three shown) embedded within the polymer composite 132 and extending along all or a portion of the length of the cable 126. The optical fibers 134 may be useful for obtaining distributed acoustic, Doppler, and/or temperature measurements along the length of the optical fibers 134. The optical fibers 134 may be low-transmission loss optical fibers that are either single-mode or multi-mode. In some instances, the optical fibers 134 may have a coating or a cladding 136 disposed thereon or otherwise encapsulating the optical fibers 134. The cladding 136 may be a high-temperature coating made of, for example, a thermoplastic material, a thermoset material, a metal, an oxide, carbon fiber, or any combination thereof. The cladding 308 may improve the mechanical bonding strength of the optical fibers 134 to the polymer composite 132, reduce thermal expansion mismatch between the optical fibers 134 and the materials of the polymer composite 132, and/or provide a hermetic seal that protects the optical fibers 134 from moisture and/or hydrogen that might induce artificial signal attenuation by hydroxyl ion or molecular hydrogen absorption.

In other embodiments, the optical fibers 134 may each be sealed and otherwise loosely housed within a hollow or "loose" tube 138 and otherwise embedded within the polymer composite 132. The loose tube 138 provides an elongated housing for the optical fibers 134 but also isolates the optical fibers 134 from tensile stresses or strains that may be assumed by the polymer composite 132 during downhole deployment and operation.

As illustrated, the cable 126 may also include one or more (two shown) electrical conductors 146 embedded within the polymer composite 132 and extending along the length of the cable 126. The electrical conductors 146 may supply electrical power and/or facilitate communication between the tool string 114 (FIG. 1A) and the surface processing unit 118 (FIG. 1A). The electrical conductors 146 may be sealed and otherwise loosely housed within a tubing 148 that provides an elongated housing for the electrical conductors 146 and protects the electrical conductors 146 from tensile stresses or strains that may be assumed by the polymer composite 132 during operation.

Returning to FIG. 1A, with the cable 126 extended in the wellbore 102, measurements along the length of the cable 126 or at selected points may then be obtained to determine one or more well parameters. The optical fiber(s) 134 (FIG. 1B) embedded within the cable 126 may be in optical communication at the surface with a data processing unit 160 located on board the surface processing unit 118. The data processing unit 160 may include an electromagnetic radiation source 140 and a data acquisition system 142.

The electromagnetic radiation source 140 may be configured to emit and otherwise introduce electromagnetic radiation into the optical fiber(s) 134. The electromagnetic radiation source 140 may include, but is not limited to, ambient light, a light bulb, a light emitting diode (LED), a laser, a blackbody radiator source, a supercontinuum source, combinations thereof, or the like. Accordingly, the electromagnetic radiation may include, but is not limited to, terahertz, infrared and near-infrared radiation, visible light, and ultraviolet light.

The data acquisition system 142 may include one or more detectors 144 positioned to sense and otherwise monitor the intensity of the returning backscattered electromagnetic radiation for analysis. The detector 144 may be an optical transducer. The detector 144 may comprise, but is not limited to, a thermal detector (e.g., a thermopile or photoacoustic detector), a semiconductor detector, a piezo-electric detector, a charge coupled device (CCD) detector, a photodetector, a video or array detector, a split detector, a photon counter detector (such as a photomultiplier tube), any combination thereof, or any other detectors known to those skilled in the art.

The data acquisition system 142 may further include a signal processor or signal analysis equipment associated with the detector 144, which may include a standard optical spectral analyzer having a processor for processing, storing in a computer-readable storage medium for storing a program code executed by the processor, and displaying to a user the detected results. Examples of a computer-readable storage medium include non-transitory medium such as random access memory (RAM) devices, read only memory (ROM) devices, optical devices (e.g., CDs or DVDs), and disk drives. The signal analysis equipment is capable of converting the received signals into an electronic signal, such as a high-speed linear photodetector array, a CCD array, or a CMOS array. In some embodiments, the processor may be provided with a user interface for input and control, such as by generating reports and performing fast Fourier transform analyses. In at least one embodiment, the data acquisition system 142 may be configured to provide acoustic, Doppler, and temperature logs of the entire length of the wellbore 102 so that a well operator can analyze the presence, location, and flow rate of water between the casing 108 and the formation 106 and between overlapping sections of the casing 108.

The backscattered electromagnetic radiation measured by the detector 144 may be correlated to strain (dynamic and static) and temperature profiles sensed by the cable 126, which may be indicative of fluid flow between the surrounding formation 106 and the wellbore 102 and/or between overlapping sections of the casing 108. Since the speed of light is, at first approximation, constant along optical fibers, the distance from the surface to the point where the backscatter originated can also be readily determined when the effective refractive index of the combined fiber core and cladding is known (e.g., about 1.468 at 1550 nm). Accordingly, backscatter generated within the optical fiber(s) 134 (FIG. 1B) as measured by the detector 144 may indicate the axial position of fluid flow between the surrounding formation 106 and the wellbore 102 and/or between overlapping sections of the casing 108. After a few seconds or minutes of data gathering, noise, Doppler, and temperature logs of the entire wellbore 102 can be generated by the data acquisition system 142 and subsequently analyzed to determine the presence and location of flows between the surrounding formation 106 and the wellbore 102 and/or between overlapping sections of the casing 108.

The electrical conductors 146 (FIG. 1B) may be in electrical connection with a power source 150 included in the surface processing unit 118 that provides electrical power to the pulsed neutron sensor 124. The electrical conductors 146 may also be connected to the data acquisition system 142 that provides control/command signals to manage the operation of the pulsed neutron sensor 124. For instance, the control/command signals may be provided by a processor included in the data acquisition system 142 and capable of processing instructions stored in a computer-readable storage medium coupled thereto.

Figure 2:
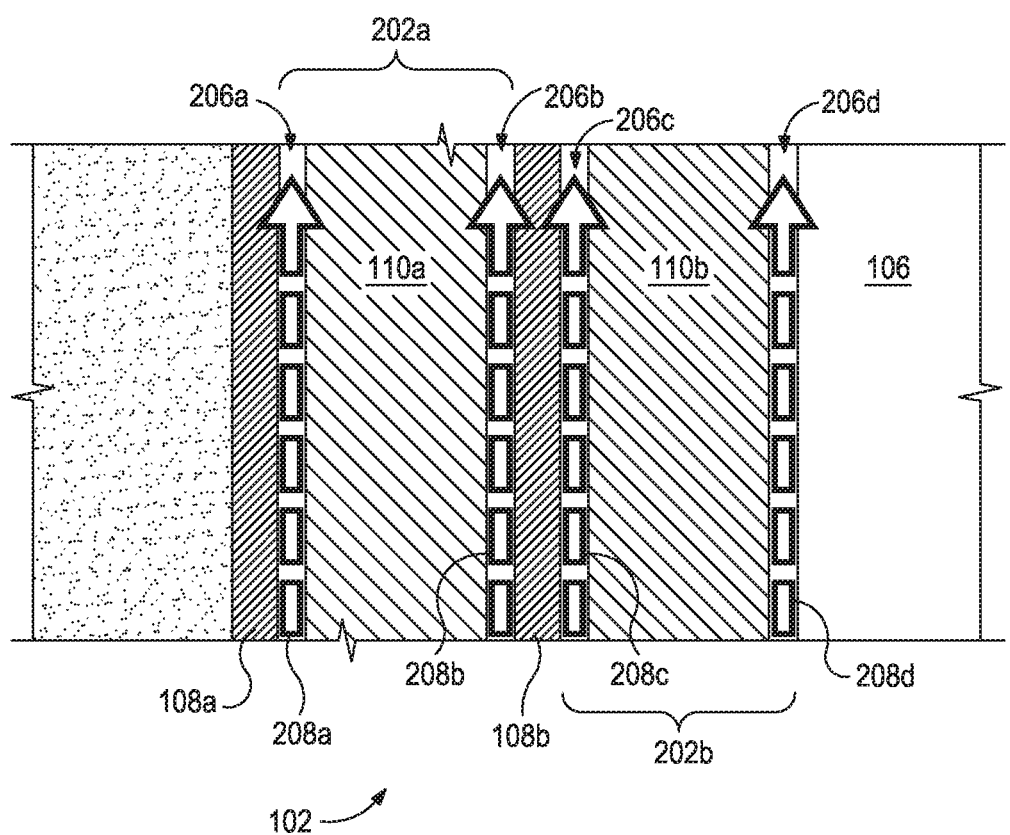
FIG. 2 depicts an enlarged cross-sectional view of a portion of the wellbore of FIG. 1A.

FIG. 2 depicts an enlarged cross-sectional view of a portion of the wellbore 102 of FIG. 1A lined with a first casing 108a and a second casing 108b. A first cement layer 110a is disposed within a first annulus 202a defined between the outer diameter of the first casing 108a and the inner diameter of second casing 108b. A second cement layer 110b is disposed within a second annulus 202b defined between the outer diameter of the second casing 202 and the formation 106. The first and second cement layers 110a,b disposed within the first and second annuli 202a,b, respectively, bond the first and second strings of casing 108a,b to the surrounding formation 106 and to each other.

A first cement interface 206a is provided at the outer diameter of the first casing 108a and the first cement layer 110a. A second cement interface 206b is provided at the inner diameter of the second casing 108b and the first cement layer 110a. A third cement interface 206c is provided at the outer diameter of the second casing 108b and the second cement layer 110b, and a fourth cement interface 206d is provided at the inner diameter of the formation 106 and the second cement layer 110b. FIG. 2 also depicts one or more potential interface flow paths 208 (shown as interface flow paths 208a, 208b, 208c, and 208d). A fluid, such as water, may be able to traverse one or more of the various interface flow paths 208a-d. According to the present disclosure, the pulsed neutron sensor 124 (FIG. 1A), the distributed acoustic sensors (DAS), the distributed Doppler sensors (DDS), and the distributed temperature sensors (DTS) obtained from the optical fibers 134 (FIG. 1B) may be cooperatively used to identify and characterize the cement interfaces 206a-d and thereby determine if there is any fluid flow at or adjacent the interface flow paths 208a-d.

In exemplary operation, and in an integrated workflow method, the tool string 114 of FIG. 1A may be lowered to a desired depth generally along the center of the wellbore 102. The pulsed neutron sensor 124 (FIG. 1A) is run in oxygen activation (OA) mode and high-energy neutrons are emitted by a neutron source (not expressly illustrated) located on the tool string 114 into the formation 106. The high-energy neutrons collide with oxygen ($^{16}O$) atoms present in any water flowing in the wellbore 102. The collision with the high-energy neutrons activates the oxygen atoms to produce an isotope of nitrogen ($^{16}N$), which decays back to oxygen with a half-life of around 7.1 seconds and emits a detectable gamma ray of energy 6.13 MeV. The emitted gamma rays are counted using the pulsed neutron sensor 124 (typically located above the neutron source) while the tool string 114 is pulled uphole at a predetermined velocity. The gamma rays also indicate whether the water flow is uphole or downhole. This is because gamma rays emitted from water moving in the uphole direction will be detected by the tool string 114 that is also moving in the uphole direction. If the water flow were in the downhole direction, the gamma rays would not be detected. The pulsed neutron sensor 124 may be calibrated such that it detects the gamma rays having energies only in a window near 6.13 MeV, and, as a result, stationary oxygen (e.g., from the silica in the formation 106) and other background signals are eliminated.

Based on the gamma rays received, the pulsed neutron sensor 124 may generate a pulsed neutron log. The pulsed neutron log may be analyzed to obtain pulsed neutron log (PNL) data including the travel time (e.g., time required for the gamma rays to reach the pulsed neutron sensor 124) and energy spectrum ratios of the near counts and the far counts of the gamma rays received by the pulsed neutron sensor 124. For instance, if a water flow is adjacent the interface flow path 208a, the number of gamma rays received will be larger than the number of gamma rays received from a water flow that is adjacent the interface flow path 208c. This is because gamma rays emitted by the water flow in the interface flow path 208c may be absorbed by the first cement layer 110a, and their number may decrease by the time the gamma rays reach the pulsed neutron sensor 124. The travel time and energy spectrum ratios are provided to a model that determines (or predicts) the velocity of the water flow in each flow path in the wellbore 102 and the radial distance of each flow path from center of the wellbore 102 (or, alternatively, the radial distance from the tool string 114).

Figure 3:
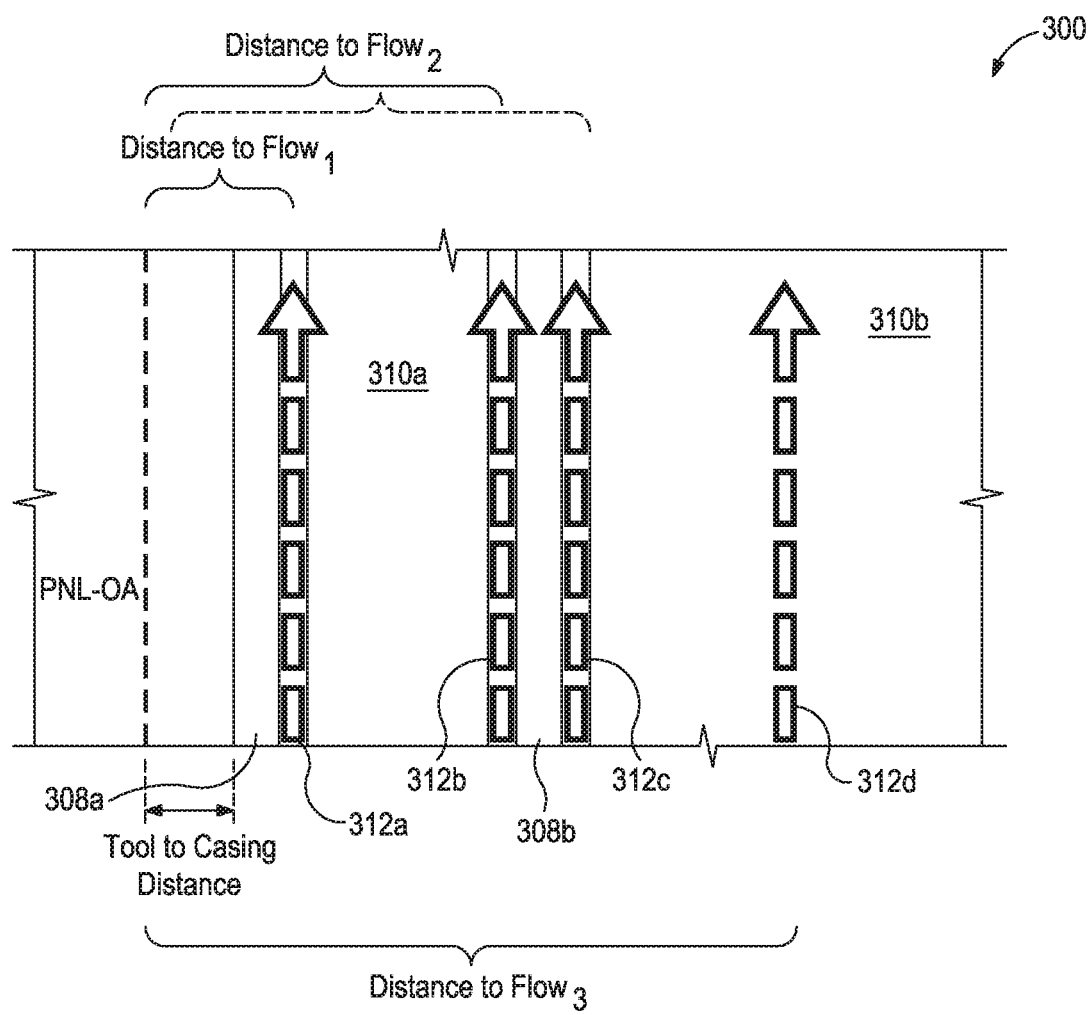
FIG. 3 illustrates a semi-descriptive borehole model derived from pulsed neutron log data.

FIG. 3 illustrates an exemplary semi-descriptive borehole model 300 derived from pulsed neutron log (PNL) data obtained from the pulsed neutron sensor 124 (FIG. 1A). As used herein, the term "semi-descriptive borehole model" indicates that the model (for instance, a mathematical model) may not be an exact representation of the wellbore, but characterizes the wellbore 102 with a level of accuracy adequate for determining any water flow in the wellbore 102. The pulsed neutron log—oxygen activation (PNL-OA) borehole model 300 characterizes the wellbore 102, and, when provided with the PNL data, determines (or predicts) the velocity of the water flow in each flow path in the wellbore 102 and the radial distance of each flow path from center of the wellbore 102.

For instance, as illustrated, the model 300 characterizes the wellbore 102 as being lined with a first casing 308a and a second casing 308b. The first casing 308a may characterize the first casing 108a (FIG. 2) and the second casing 308b may characterize the second casing 108b (FIG. 2). A first region 310a, characterizing the first cement layer 110a (FIG. 2), is defined between the first casing 308a and the second casing 308b. A second region 310b may be defined adjacent the second casing 308b. The second region 310b may collectively represent the second cement layer 110b and the formation 106 in FIG. 2. Since the measurement by the pulsed neutron sensor 124 is a dynamic measurement, the pulsed neutron sensor 124 cannot distinguish between the second cement layer 110b (FIG. 2) and the formation 106 (FIG. 2) if no gap is present if the well is shut-in. In other words, the pulsed neutron sensor 124 may not be able to determine the presence of a fourth interface 206d (FIG. 2) if no gap is present or if there is not flow in the gap while the measurement is taking place. However, if flow path 208d (FIG. 2) is present and the well is flowing, the fourth interface 206d may be detected by the pulsed neutron sensor 124, and, as a result, the model 300 is able to characterize the fourth interface 206d and the corresponding water flow 312d.

As a result, from the PNL data obtained, the model 300 predicts the radial distance of the flow paths 312a-d and the velocity of the water flow in each flow path 312a-d. It should be noted that, due to the limitation in the resolution, the pulsed neutron sensor 124 also may not distinguish the flow 312b (at the interface 106b, FIG. 2) from the flow path 312c (at the interface 106c, FIG. 2). Thus, the model 300 assumes the flow paths 312b,c to be at the same radial distance from the center of the wellbore 102. It will be understood that the number of flow paths illustrated in FIG. 3 is merely an example and the number of flow paths may increase or decrease depending on the PNL data provided to the model 300.

The DAS formed by one or more of the optical fibers 134 (FIG. 1B) of the cable 126 (FIGS. 1A and 1B) may be configured to "listen" to the noise generated due to the flow of water at the interfaces between the casing 108, the cement 110, and the formation 106 and generate a corresponding noise log (NL). The acoustic wave (or signal) generated due to the noise of the water flow may impinge upon the optical fiber(s) 134 causing the optical fiber(s) 134 to strain. The backscattered signal may be used to provide information regarding the time varying state of strain along the optical fiber(s) 134, which may be equated to locations where the acoustic wave was generated. The noise log generated by the data acquisition system 142 (FIG. 1A) may be analyzed to obtain noise log data including amplitude of a noise signal generated by each water flow (of the one or more water flows) at the interfaces, a frequency spectrum of the noise signals generated by each water flow, a relative phase shift between the noise signals, frequency ratios of the near and far noise signals, and power spectral density of the noise signals. The amplitude and frequency information obtained may be provided to a DAS borehole model that determines (or predicts) the velocity of the water flow in each flow path determined to be present in the wellbore 102 and the radial distance of each flow path from the center of the wellbore 102 (or, alternatively, the radial distance from the tool string 114).

Figure 4:
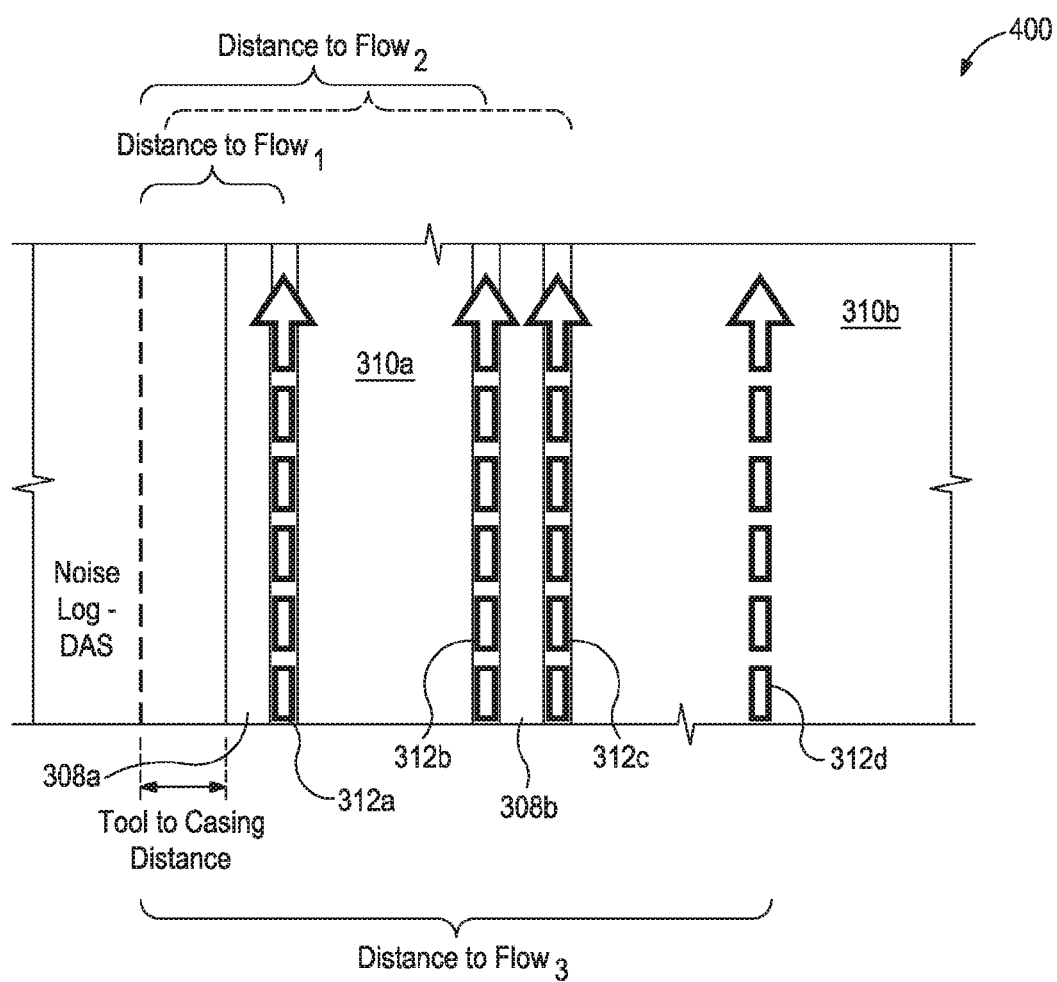
FIG. 4 illustrates a semi-descriptive borehole model derived from optical fiber measurements obtained from the distributed acoustic sensors of FIGS. 1A and 1B.

FIG. 4 illustrates an exemplary semi-descriptive DAS borehole model 400 derived from NL data generated by the data acquisition system 142 (FIG. 1A) using the distributed acoustic sensors (DAS). The DAS and the pulsed neutron sensor 124 (FIG. 1A) obtain data from the same wellbore 102 and at approximately the same distance. Accordingly, similar physical phenomena (the water flow, for instance) are measured by the pulsed neutron sensor 124 and the DAS at similar distances. Further, the pulse neutron sensor 124 and the DAS may each have similar resolution limitations and similar depth of investigation. The DAS borehole model 400 may be similar in some respects to the model 300 in FIG. 3, and therefore may be best understood with reference thereto where like numerals designate like components not described again in detail. As described above with respect to model 300, the model 400 may characterize the wellbore 102, and, when provided with the NL data, may predict the velocity of the water flow in each flow path 312*a-d* and the radial distance of each flow path 312*a-d* from the center of the wellbore 102.

The model 400 may determine the radial distance from the amplitude information. For instance, the amplitude of a noise signal generated by a water flow close to the cable 126 is larger than the amplitude of a noise signal generated by a water flow further away from the cable 126. From the frequency information, the model 400 predicts the width of the flow path through which the water flows, and the velocity of the water flow. For instance, a higher frequency may indicate a flow path 312*a-d* having a smaller width and water flowing with a higher velocity, and a lower frequency may indicate a flow path 312*a-d* having a larger width and water flowing with a relatively smaller velocity.

Accordingly, based on the NL data provided, the model 400 determines the radial distance of the flow paths 312*a-d* and the velocity of the water flow in each flow path 312*a-d*. Since the measurement by the DAS is a dynamic measurement, based on the NL data obtained, it may not be possible to distinguish between the second cement layer 110*b* (FIG. 2) and the formation 106 (FIG. 2) if no gap is present or if the well is shut-in. In other words, the data acquisition system 142 may not be able to determine the presence of the fourth interface 206*d* (FIG. 2) if no gap is present or if there is no water flow while measurement is being performed. However, if the flow path 208*d* is present and the well is flowing, the fourth interface 206*d* may be detected (for instance, by the data acquisition system 142), and the model 400 is able to characterize the fourth interface 206*d* and the water flow 312*d*. It will be understood that the number of flow paths illustrated in FIG. 4 is merely an example, and the number of flow paths 312*a-d* may be more or less depending on the NL data provided to the model 400.

Once the PNL data and the NL data are obtained, a first comparison operation may be performed, wherein the velocity of the water flow in each flow path 312*a-d* and the radial distance of each flow path 312*a-d* as predicted by the model 400 are compared with the velocity of the water flow in a corresponding flow path 312*a-d* and the radial distance of a corresponding flow path 312*a-d* as predicted by the model 300. The predictions from the models 300 and 400 may be determined to match each other when, for example, the standard deviation between the two predictions is within a predetermined value. If the predictions do not match, the model 300 and/or the model 400 may be updated. Updating the models 300 and 400 may entail recalculating the velocity of the water flow in each flow path 312*a-d* and the radial distance of the flow paths 312*a-d*. The process may repeat iteratively until the velocity and the radial distance of the water flows obtained from the model 300 match the velocity and the radial distance of the water flows obtained by the model 400, thereby resulting in first calculated values of the velocity of each water flow and the radial distance of each flow path 312*a-d*. From the above, it will thus be understood that the characterization of the flow paths 312*a-d* in FIGS. 3 and 4 by the respective models 300 and 400 may be subject to change based on the above-mentioned comparison operation and the subsequent calculations performed by the models 300 and 400.

The DDS formed by one or more of the optical fibers 134 (FIG. 1B) of the cable 126 (FIGS. 1A and 1B) may receive an acoustic wave modified by the formation 106 and the wellbore 102. A Doppler log is generated by the data acquisition system 142 based on the modified acoustic wave received. The Doppler log is analyzed to obtain Doppler log data including the amplitude and frequency of the modified acoustic wave, and the Doppler frequency shift between the emitted acoustic wave and the modified acoustic wave. The Doppler log data may be provided to a DDS borehole model that determines (or predicts) the velocity of the water flow in each flow path determined to be present in the wellbore 102 and the radial distance of each flow path from center of the wellbore 102 (or, alternatively, the radial distance from the tool string 114).

Figure 5:
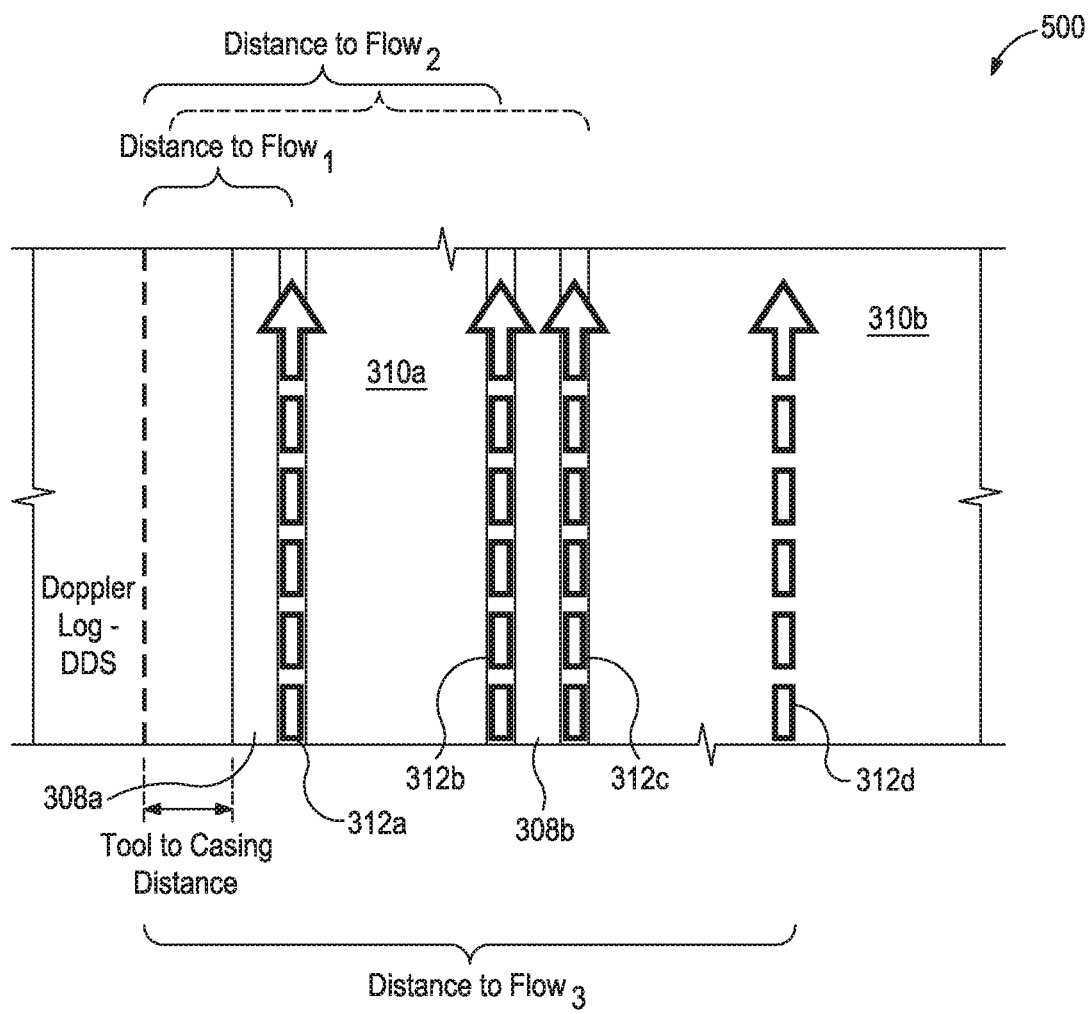
FIG. 5 illustrates a semi-descriptive borehole model derived from data obtained from the distributed Doppler sensors of FIGS. 1A and 1B.

FIG. 5 illustrates an exemplary semi-descriptive DDS borehole model 500 derived from Doppler log data generated by the data acquisition system 142 using the distributed Doppler sensor (DDS). Like the pulsed neutron sensor 124 and the DAS, the DDS also obtains measurement data from the same wellbore 102 at approximately the same distance as the pulsed neutron sensor 124 and DAS. Accordingly, similar physical phenomena (the water flow, for instance) are measured by the pulsed neutron sensor 124, the DAS, and the DDS at similar distances. Further, the pulse neutron sensor 124, the DAS, and the DDS may each have similar resolution limitations and similar depth of investigation. The DDS borehole model 500 may be similar in some respects to the models 300 and 400 in FIGS. 3 and 4, respectively, and therefore may be best understood with reference thereto where like numerals designate like components not described again in detail.

Similar to models 300 and 400, the model 500 may characterize the wellbore 102 and, when provided with the Doppler log data from the data acquisition system 142, may predict the velocity of the water flow in each flow path 312*a-d* and the radial distance of each flow path 312*a-d* from the center of the wellbore 102. Since the measurement performed by the DDS is a dynamic measurement, based on the Doppler log data obtained, it may not be possible to distinguish between the second cement layer 110*b* (FIG. 2) and the formation 106 (FIG. 2) if no gap is present or if the well is shut-in. In other words, the data acquisition system 142 may not be able to determine the presence of the fourth interface 206d (FIG. 2) if no gap is present or if there is no flow in the gap while the measurement is taking place. However, if the flow path 208d is present and the well is flowing, the fourth interface 206d may be detected by the data acquisition system 142, and, as a result, the model 500 is able to characterize the fourth interface 206d (FIG. 2) and the water flow 312d. It will be understood that the number of flow paths 312a-d illustrated in FIG. 5 is merely an example, and the number of flow paths 312a-d may be more or less depending on the Doppler log data provided to the model 500.

Once the DDS log data is obtained, a second comparison operation may be performed, wherein the velocity of the water flow in each flow path 312a-d and the radial distance to each flow path 312a-d as predicted by the model 500 are compared with the first calculated values of the velocity of the water flow in each flow path 312a-d and the radial distance of the flow paths 312a-d obtained from the first comparison operation. If the predictions by the model 500 do not match the velocity of the water flow in each flow path 312a-d and the radial distance of the flow paths 312a-d obtained from the first comparison operation, one or more of the models 300, 400, and 500 may be updated. Updating the models 300, 400, and 500 may entail recalculating the velocity of the water flow in each flow path 312a-d and the radial distance of the flow paths 312a-d. The process repeats iteratively until the velocity and the radial distance of the water flow obtained from the first comparison operation match the velocity and the radial distance of the water flow obtained by the model 500, thereby resulting in second calculated values of the velocity of each water flow and the radial distance of each flow path 312a-d. These second calculated values are used later in the process as described further below. From the above, it will thus be understood that the characterization of the flow paths 312a-d in FIGS. 3, 4, and 5 by the respective models 300, 400, and 500 is subject to change based on the above-mentioned comparison operation and the subsequent calculations performed by the models 300, 400, and 500.

The wellbore 102 may be characterized using a static borehole model. The static borehole model is constructed based on a completed wellbore 102 and includes data obtained from drilling and completion operations, log analysis, cuttings, casing specifications, cement specifications, bit size, caliper, tubing size, formation properties—lithology, porosity, water saturation, etc., acoustic impedance of the casing and cement, heat capacity of the casing and cement, noise and temperature conduction in the casing, cement, and formation, specific velocity of sounds casing, cement, and formation, and the like. Using the static borehole model, a DTS borehole model is obtained.

The data acquisition system 142 obtains the temperature of the formation 106 and the wellbore 102 using the DTS formed by one or more of the optical fibers 134 (FIG. 1B) of the cable 126 (FIGS. 1A and 1B), and creates a temperature profile based on the obtained temperature information. The temperature profile includes a variation in the temperature due to one or more water flows at the time of measurement and temperature variations due to one or more water flows that occurred during a predetermined time interval in the past. This predetermined time interval may occur any time between the plug and abandonment operation of the well and the time the temperature is measured. The temperature variations may be caused due to a higher temperature water flow from a downhole location. For instance, since temperature in the sub-surface increases with depth, water flowing from a downhole location to an uphole location will increase the temperature at the uphole location. Further, heat will be generated due to friction of the water flow with the surroundings, which will also contribute to temperature increases.

From the temperature profile, temperature data including the temperature value at a given depth (e.g., the amplitude of the temperature profile at a given time), the temperature gradient (the rate of increase in temperature with depth), and a derivative of the temperature profile may be obtained.

The temperature data from the data acquisition system 142 may be provided to a DTS borehole model that determines (or predicts) the velocity of the water flow in each flow path determined to be present in the wellbore 102 and the radial distance of each flow path from the center of the wellbore 102 (or, alternatively, the radial distance from the tool string 114). The DTS borehole model may be similar to any one of the above-disclosed models 300, 400, and 500, and the operation thereof may be understood with respect to the operation of any of the models 300, 400, and 500, as disclosed above. However, unlike the models 300, 400, and 500, the DTS borehole model may be able to characterize the fourth interface 206d (FIG. 2) and the water flow 208d (FIG. 2) even when the measurement is performed with the well shut-in. This is because, from the temperature profile and the static borehole model, the DTS borehole model may determine that any temperature variation not detected either because the variation is beyond the depth of investigation of the pulsed neutron sensor 124, the DAS, and the DDS, or because the variation occurred while the well was flowing, but detected while the well is shut-in, has to be occurring due to a presence of a water flow at the fourth interface 206d.

Once DTS data is obtained, a third comparison operation may be performed, wherein the velocity of the water flow and the radial distance to each flow path as predicted by the temperature borehole model are compared with the second calculated values of the velocity of the water flow in each flow path and the radial distance of the flow paths obtained from the second comparison operation described above. If the predictions by the DTS borehole model do not match the velocity of the water flow in each flow path and the radial distance of the flow paths obtained from the second comparison operation, one or more of the models 300, 400, 500, and the DTS borehole model may be updated. Updated the models 300, 400, 500, and the DTS borehole model may entail recalculating the velocity of the water flow in each flow path and the radial distance of the flow paths as obtained from one or more of the models 300, 400, and 500. The process repeats iteratively until the velocity and the radial distance of the water flow obtained from the second comparison operation match the velocity and the radial distance of the water flow obtained by the DTS borehole model, thereby resulting in the widths of the flow paths 312a-d at the cement interfaces 206a-d, the velocity of the water flow in each of the flow paths 312a-d, and the radial distance to the water flow.

It should be noted that the measurements performed using the pulsed neutron sensor, the DAS, and the DDS are considered dynamic measurements and the corresponding models are considered dynamic semi-descriptive models. This is because the water flow has to be moving for each of these sensors to obtain the respective measurement data. For instance, no noise is generated by stationary water, and thus the DAS cannot obtain noise signals from the wellbore. Similarly, stationary water cannot produce variations in amplitude and frequency as required when operating the DDS. The measurements performed by the DTS are considered as pseudo-dynamic measurements, since these measurements are performed on water that was flowing in the past and which may be not be flowing at the time of measurement.

According to embodiments disclosed above, the models 300, 400, 500, and the DTS borehole model characterize the wellbore 102 and the surrounding regions assuming that the cable 126 including the optical fiber(s) 134 is located generally along the center of the wellbore 102, as illustrated in FIG. 1A. However, it will be understood that, if the cable 126 is positioned in the annulus 111 or any other region of the wellbore 102, different borehole models may be used to characterize the wellbore 102 and the surrounding regions.

Figure 6:
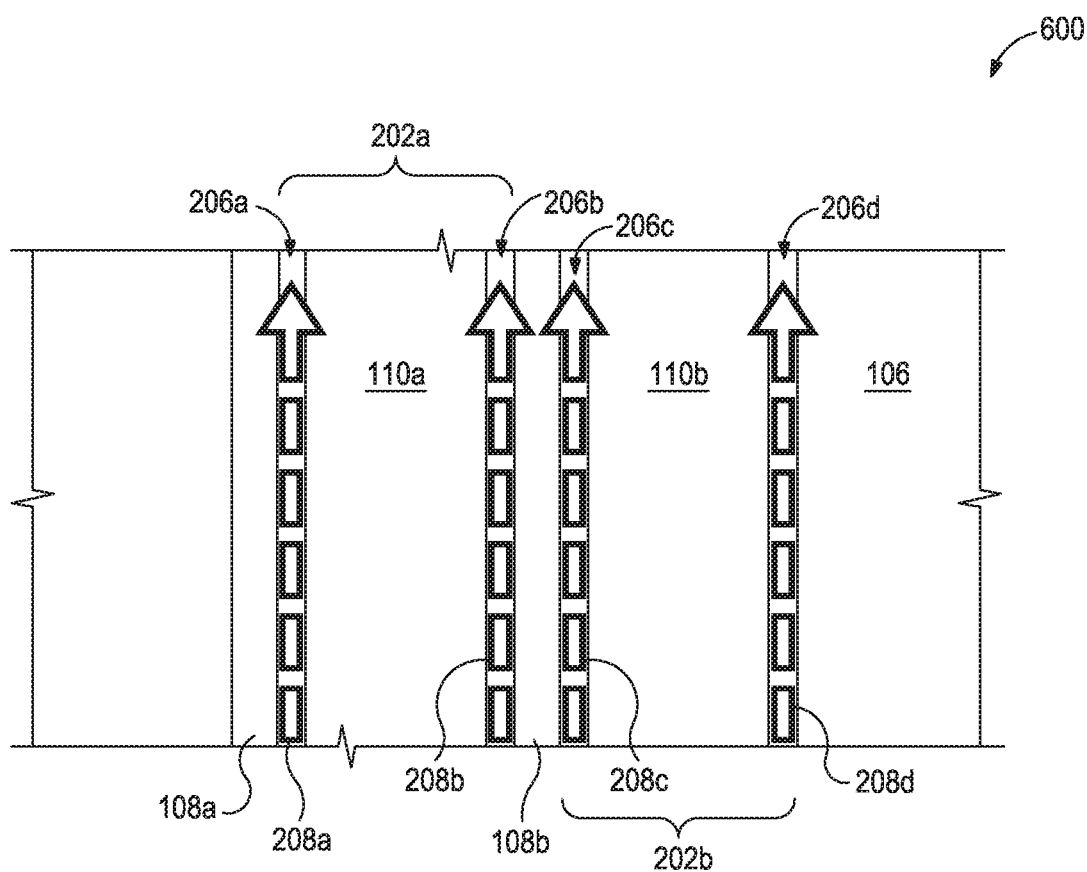
FIG. 6 denotes the borehole model derived from an integrated workflow method.

FIG. 6 illustrates a borehole model 600 derived from the above-described integrated workflow method for evaluating annular flow of water between multiple casing strings. The borehole model 600 may be best understood with reference to FIG. 2, where like numerals designate like components not described again in detail. The borehole model 600 may be referred to as a descriptive model since the model 600 may be a near exact representation of the wellbore 102 illustrated in FIG. 2. Using the borehole model 600, for example, it may thus be possible to determine the widths of the flow paths 208*a-d* at the cement interfaces 206*a-d*, the velocity of the water flow in each of the flow paths 208*a-d*, and the radial distance to the water flow with relatively high accuracy.

Figure 7:
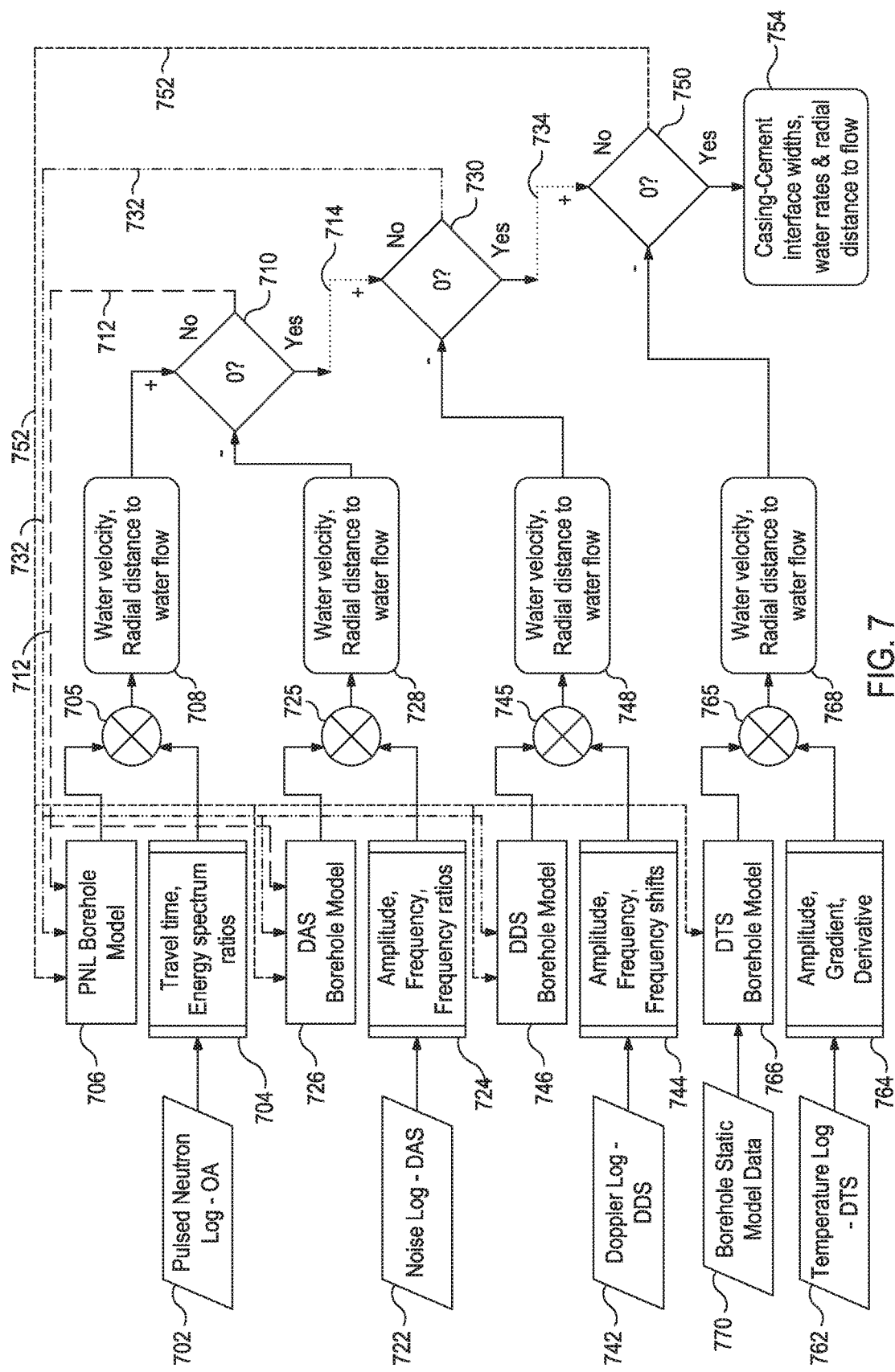
FIG. 7 is a flowchart schematic of an exemplary workflow method to identify and characterize fluid flow at cement interfaces in a wellbore.

FIG. 7 is a flowchart schematic of an exemplary integrated workflow method 700 for determining the presence of a water flow in a wellbore. It should be noted that methods consistent with the present disclosure may include at least some, but not all of the activities (steps) illustrated in method 700, performed in a different sequence.

The method 700 may include obtaining a pulsed neutron log (PNL) from the pulsed neutron sensor 124 (FIG. 1A), as at 702. The method 700 then extracts (e.g., via deconvolution) PNL data including the travel time and energy spectrum ratios of gamma rays received from the wellbore 102, as at 704. As at 705, the PNL data is provided to a PNL borehole model (obtained at 706). The PNL borehole model may be similar to or the same as the model 300 illustrated in FIG. 3 and, when provided with the PNL data, the PNL borehole model determines a first radial distance of one or more flow paths from center of the wellbore 102 and a first velocity value of the water flow in each of the one or more flow paths, as at 708.

A noise log (NL) is obtained from the data acquisition system 142 (FIG. 1A) via the distributed acoustic sensors, as at 722. The method 700 then extracts (e.g., via deconvolution) from the noise log data including one or more of the amplitudes of the noise signals, a frequency spectrum of the noise signals, a relative phase shift between the noise signals, frequency ratios of the near and far noise signals, and power spectral density of the noise signals, as at 724. The method 700 provides a DAS borehole model, as at 726. The DAS borehole model may be similar to the model 400 illustrated in FIG. 4, and is provided the NL data, as at 725. Based on the NL data, the DAS borehole model determines a second radial distance of the one or more flow paths from center of the wellbore 102 and a second velocity value of the water flow in each of the one or more flow paths, as at 728.

At 710, a first comparison operation is performed, wherein the first radial distances and the first velocity values are compared with the corresponding second radial distances and the second velocity values. If the standard deviation between the first and the second radial distances and/or between the first and velocity values is greater than a predetermined value, the PNL borehole model (706) and/or the DAS borehole model (726) are updated, as at 712. To accomplish this, the respective radial distances and the velocity values are recalculated based on an updated PNL borehole model (706) and/or DAS borehole model (726).

If the standard deviation between the first and the second radial distances and/or between the first and velocity values is less than or equal to the predetermined value, a first result is obtained, as at 714. The first result includes the radial distance of the one or more flow paths in the wellbore 102 and the velocity of water flow in each flow path as obtained from any one of the PNL borehole model and the DAS borehole model.

At 742, a Doppler log is obtained from the data acquisition system 142 (FIG. 1A) using the distributed Doppler sensors (DDS) and, at 744, Doppler data including an amplitude and frequency information of the modified acoustic wave, and the Doppler frequency shift is extracted (e.g., via deconvolution) from the Doppler log. As at 745, the method 700 provides the Doppler data to the DDS borehole model, which is obtained at 746. The DDS borehole model may be similar to the model 500 illustrated in FIG. 5, and, when provided with the Doppler data, the DDS borehole model determines third radial distance of the one or more flow paths from center of the wellbore 102 and a third velocity value of the water flow in each of the one or more flow paths, as at 748.

At 730, a second comparison operation is performed, wherein the third radial distances and the third velocity values are compared with the radial distances and velocity values in the first result obtained at 714. If the standard deviation therebetween is greater than a predetermined value, the PNL borehole model (706), the DAS borehole model (726), and/or the DDS borehole model (746) are updated, as at 732. The respective radial distances and the velocity values are recalculated based on an updated PNL borehole model (706), DAS borehole model (726), and/or DDS borehole model (746).

If the standard deviation is less than or equal to the predetermined value, a second result is obtained, as at 734. The second result includes the radial distance of the one or more flow paths in the wellbore 102 and the velocity of water flow in each flow path as obtained from any one of the PNL borehole model (706), the DAS borehole model (726), and/or the DDS borehole model (746).

At 762, a temperature profile is generated from the data obtained using the distributed temperature sensors (DDS) and, at 764, temperature data including the temperature value at a given depth (e.g., the amplitude of the temperature profile at a given time), the temperature gradient (the rate of increase in temperature with depth), and a derivative of the temperature profile is extracted (e.g., via deconvolution) from the temperature data. As at 770, borehole static model data is obtained, and a DTS borehole model is created based on the data obtained, as at 766. This DTS borehole model may be similar to the DTS borehole model described above, and when provided with the temperature data, as at 765, the DTS borehole model (obtained at 766) determines a fourth radial distance of the one or more flow paths from center of the wellbore 102 and a fourth velocity value of the water flow in each of the one or more flow paths, as at 768.

At 750, a third comparison operation is performed, wherein the fourth radial distances and the fourth velocity values are compared with the radial distances and velocity values in the second result obtained at 734. If the standard deviation therebetween is greater than a predetermined value, the PNL borehole model (706), the DAS borehole model (726), the DDS borehole model (746), and/or the DTS borehole model (766) are updated, as at 752. The respective radial distances and the velocity values are recalculated based on an updated PNL borehole model (706), DAS borehole model (726), DDS borehole model (746), and/or the DTS borehole model (766).

If the standard deviation is less than or equal to the predetermined value, the widths of the flow paths at the cement interfaces, the velocity of the water flow in each of the flow paths, and the radial distance to the water flow are obtained, as at 754.

Embodiments disclosed herein include:

A: A method that includes conveying a tool string into a wellbore at least partially lined with a first casing and a second casing concentrically overlapping a portion of the first casing, wherein a first annulus is defined between the first and second casings and filled with a first cement, and a second annulus is defined between the second casing and the wellbore and filled with a second cement, obtaining wellbore data from a pulsed neutron sensor included in the tool string and optical fiber measurements from one or more optical fibers included in a cable positioned in the wellbore, calculating a first distance of a flow path from the tool string and a first velocity of a water flow in the flow path using a pulsed neutron log borehole model and the wellbore data obtained from the pulsed neutron sensor, the flow path being located at a cement interface in the wellbore, calculating a second distance of the flow path from the tool string and a second velocity of the water flow in the flow path using a distributed acoustic sensor (DAS) borehole model and distributed acoustic sensing measurements obtained from the one or more optical fibers, comparing the first and second distances and the first and second velocities and thereby obtaining a first calculated distance of the flow path and a first calculated velocity of the water flow, calculating a third distance of the flow path from the tool string and a third velocity of the water flow in the flow path using a distributed Doppler sensor (DDS) borehole model and distributed Doppler sensing measurements obtained from the one or more optical fibers, comparing the third distance with the first calculated distance to obtain a second calculated distance of the flow path and comparing the third velocity and the first calculated velocity to obtain a second calculated velocity of the water flow, calculating a fourth distance of the flow path from the tool string and a fourth velocity of the water flow in the flow path using a distributed temperature sensor (DTS) borehole model and distributed temperature sensing measurements obtained from the one or more optical fibers, and comparing the fourth distance and the fourth velocity with the second calculated distance and the second calculated velocity, respectively, to determine a width of the cement interface, a distance of the cement interface from the tool string, and a velocity of a water flow in the cement interface.

B: A well system that includes a tool string and a cable positioned in a wellbore drilled through one or more subterranean formations and at least partially lined with a first casing and a second casing concentrically overlapping a portion of the first casing, wherein a first annulus is defined between the first and second casings and filled with a first cement, a second annulus is defined between the second casing and the wellbore and filled with a second cement, the tool string includes a pulsed neutron sensor, and the cable includes one or more optical fibers used to obtain optical fiber measurements, and a data acquisition system including a processor and a non-transitory computer readable medium, the tool string and the cable communicatively coupled to the data acquisition system, and the computer readable medium stores a computer readable program code, when executed by the processor, configures the processor to operate the pulsed neutron sensor to obtain wellbore data, calculate a first distance of a flow path from the tool string and a first velocity of a water flow in the flow path using a pulsed neutron log borehole model and the wellbore data, the flow path located at a cement interface in the wellbore, operate the data acquisition system to obtain distributed acoustic sensing measurements from the wellbore using the one or more optical fibers, calculate a second distance of the flow path from the tool string and a second velocity of the water flow in the flow path using a distributed acoustic sensor (DAS) borehole model and the distributed acoustic sensing measurements, compare the first and second distances and the first and second velocities and thereby obtain a first calculated distance of the flow path and a first calculated velocity of the water flow, operate the data acquisition system to obtain distributed Doppler sensing measurements from the wellbore using the one or more optical fibers, calculate a third distance of the flow path from the tool string and a third velocity of the water flow in the flow path using a distributed Doppler sensor (DDS) borehole model and the distributed Doppler sensing measurements, compare the third distance and the first calculated distance to obtain a second calculated distance of the flow path and compare the third velocity and the first calculated velocity to obtain a second calculated velocity of the water flow, operate the data acquisition system to obtain distributed temperature sensing measurements from the wellbore using the one or more optical fibers, calculate a fourth distance of the flow path from the tool string and a fourth velocity of the water flow in the flow path using a distributed temperature sensor (DTS) borehole model and the distributed temperature sensing measurements, and compare the fourth distance and the fourth velocity with the second calculated distance and the second calculated velocity, respectively, to determine a width of the cement interface, a distance of the cement interface from the tool string, and a velocity of a water flow in the cement interface.

Each of embodiments A and B may have one or more of the following additional elements in any combination: Element 1: wherein obtaining wellbore data from the pulsed neutron sensor comprises at least one of obtaining travel times of gamma rays received by the pulsed neutron sensor and obtaining energy spectrum ratios of near counts and far counts of gamma rays received by the pulsed neutron sensor. Element 2: wherein obtaining the optical fiber measurements from the one or more optical fibers comprises one or more of obtaining amplitudes of noise signals detected by the one or more optical fibers from the wellbore, obtaining a frequency spectrum of the noise signals, obtaining a relative phase shift between the noise signals, obtaining frequency ratios of near and far noise signals, and obtaining power spectral density of the noise signals. Element 3: wherein obtaining optical fiber measurements from the one or more optical fibers comprises one or more of obtaining amplitude and frequency information of an acoustic wave as modified by the wellbore, and a Doppler frequency shift between an acoustic wave emitted into the wellbore and the modified acoustic wave. Element 4: wherein obtaining the optical fiber measurements from the one or more optical fibers comprises one or more of obtaining a temperature of the wellbore, obtaining a temperature gradient of the wellbore, and obtaining a derivative of a temperature profile of the wellbore. Element 5: further comprising updating at least one of the pulsed neutron log borehole model and the DAS borehole model when a difference between the first and second distances and a difference between the first and second velocities is greater than a predetermined value. Element 6: further comprising recalculating the first distance and the first velocity, and the second distance and the second velocity using a corresponding updated model. Element 7: further comprising updating one or more of the pulsed neutron log borehole model, the DAS borehole model, and the DDS borehole model when a difference between the first calculated distance and the third distance and a difference between the first calculated velocity and the third velocity is greater than a predetermined value. Element 8: further comprising recalculating the first distance and the first velocity, the second distance and the second velocity, and the third distance and the third velocity using a corresponding updated model. Element 9: further comprising updating one or more of the pulsed neutron log borehole model, the DAS borehole model, the DDS borehole model, and the DTS borehole model when a difference between the second calculated distance and the fourth distance and a difference between the second calculated velocity and the fourth velocity is greater than a predetermined value. Element 10: further comprising recalculating the first distance and the first velocity, the second distance and the second velocity, the third distance and the third velocity, and the fourth distance and the fourth velocity using a corresponding updated model. Element 11: further comprising obtaining the DTS borehole model from a static borehole model.

Element 12: wherein the processor is further configured to update at least one of the pulsed neutron log borehole model and the DAS borehole model when a difference between the first and second distances and a difference between the first and second velocities is greater than a predetermined value. Element 13: wherein the processor is further configured to recalculate the first and second distances and the first and second velocities using a corresponding updated model. Element 14: wherein the processor is further configured to update one or more of the pulsed neutron log borehole model, the DAS borehole model, and the DDS borehole model when a difference between the first calculated distance and the third distance and a difference between the first calculated velocity and the third velocity is greater than a predetermined value. Element 15: wherein the processor is further configured to recalculate the first distance and the first velocity, the second distance and the second velocity, and the third distance and the third velocity using a corresponding updated model. Element 16: wherein the processor is further configured to update one or more of the pulsed neutron log borehole model, the DAS borehole model, the DDS borehole model, and the DTS borehole model when a difference between the second calculated distance and the fourth distance and a difference between the second calculated velocity and the fourth velocity is greater than a predetermined value. Element 17: wherein the processor is further configured to recalculate the first distance and the first velocity, the second distance and the second velocity, the third distance and the third velocity, and the fourth distance and the fourth velocity using a corresponding updated model. Element 18: wherein the cable is located suspending from the tool string or coupled to the exterior of at least one of the first and second casings.

By way of non-limiting example, exemplary combinations applicable to A and B include: Element 5 with Element 6; Element 7 with Element 8; Element 9 with Element 10; Element 13 with Element 14; Element 15 with Element 16; and Element 17 with Element 18.

Therefore, the disclosed systems and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present disclosure. The systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

What is claimed is:

1. A well system, comprising:
a tool string and a cable positioned in a wellbore drilled through one or more subterranean formations, wherein the wellbore is at least partially lined with a first casing and a second casing concentrically overlapping a portion of the first casing, wherein a first annulus is defined between the first and second casings and filled with a first cement, wherein a second annulus is defined between the second casing and the wellbore and filled with a second cement, wherein the tool string includes a pulsed neutron sensor, and wherein the cable includes one or more optical fibers used to obtain optical fiber measurements; and
a data acquisition system including a processor and a non-transitory computer readable medium, the tool string and the cable communicatively coupled to the data acquisition system, wherein the computer readable medium stores a computer readable program code that, when executed by the processor, configures the processor to:

operate the pulsed neutron sensor to obtain wellbore data;

calculate a first distance of a flow path from the tool string and a first velocity of a water flow in the flow path using a pulsed neutron log borehole model and the wellbore data obtained from the pulsed neutron sensor, the flow path located at a cement interface in the wellbore;

operate the data acquisition system to obtain distributed acoustic sensing measurements from the wellbore using the one or more optical fibers;

calculate a second distance of the flow path from the tool string and a second velocity of the water flow in the flow path using a distributed acoustic sensor (DAS) borehole model and the distributed acoustic sensing measurements;

operate the data acquisition system to obtain distributed Doppler sensing measurements from the wellbore using the one or more optical fibers;

calculate a third distance of the flow path from the tool string and a third velocity of the water flow in the flow path using a distributed Doppler sensor (DDS) borehole model and the distributed Doppler sensing measurements; and determine a width of the cement interface, a distance of the cement interface from the tool string, and a velocity of a water flow in the cement interface based on the second and third distances, and the first and second velocities.

2. The well system of claim 1, wherein the processor is further configured to:

compare the first and second distances and the first and second velocities and thereby obtain a first calculated distance of the flow path and a first calculated velocity of the water flow;

compare the third distance and the first calculated distance to obtain a second calculated distance of the flow path and compare the third velocity and the first calculated velocity to obtain a second calculated velocity of the water flow;

operate the data acquisition system to obtain distributed temperature sensing measurements from the wellbore using the one or more optical fibers;

calculate a fourth distance of the flow path from the tool string and a fourth velocity of the water flow in the flow path using a distributed temperature sensor (DTS) borehole model and the distributed temperature sensing measurements; and determine the width of the cement interface, a distance of the cement interface from the tool string, and a velocity of the water flow in the cement interface by comparing the fourth distance with the second calculated distance and the fourth velocity with the second calculated velocity.

3. The well system of claim 1, wherein the processor is further configured to:

operate the pulsed neutron sensor to obtain wellbore data comprising at least one of travel times of gamma rays received by the pulsed neutron sensor and energy spectrum ratios of near counts and far counts of gamma rays received by the pulsed neutron sensor.

4. The well system of claim 1, wherein the processor is further configured to:

operate the data acquisition system to obtain distributed acoustic sensing measurements including one or more of amplitudes of noise signals detected by the one or more optical fibers from the wellbore, a frequency spectrum of the noise signals, a relative phase shift between the noise signals, frequency ratios of near and far noise signals, and power spectral density of the noise signals.

5. The well system of claim 1, wherein the processor is further configured to:

operate the data acquisition system to obtain distributed Doppler sensing measurements including one or more of amplitude and frequency information of an acoustic wave as modified by the wellbore, and a Doppler frequency shift between an acoustic wave emitted into the wellbore and the modified acoustic wave.

6. The well system of claim 2, wherein the processor is further configured to:

operate the data acquisition system to obtain distributed temperature sensing measurements including one or more of a temperature of the wellbore, a temperature gradient of the wellbore, and a derivative of a temperature profile of the wellbore.

7. The well system of claim 1, wherein the processor is further configured to update at least one of the pulsed neutron log borehole model and the DAS borehole model when a difference between the first and second distances and a difference between the first and second velocities is greater than a predetermined value.

8. The well system of claim 7, wherein the processor is further configured to recalculate the first and second distances and the first and second velocities using a corresponding updated model.

9. The well system of claim 2, wherein the processor is further configured to update one or more of the pulsed neutron log borehole model, the DAS borehole model, and the DDS borehole model when a difference between the first calculated distance and the third distance and a difference between the first calculated velocity and the third velocity is greater than a predetermined value.

10. The well system of claim 9, wherein the processor is further configured to recalculate the first distance and the first velocity, the second distance and the second velocity, and the third distance and the third velocity using a corresponding updated model.

11. The well system of claim 2, wherein the processor is further configured to update one or more of the pulsed neutron log borehole model, the DAS borehole model, the DDS borehole model, and the DTS borehole model when a difference between the second calculated distance and the fourth distance and a difference between the second calculated velocity and the fourth velocity is greater than a predetermined value.

12. The well system of claim 11, wherein the processor is further configured to recalculate the first distance and the first velocity, the second distance and the second velocity, the third distance and the third velocity, and the fourth distance and the fourth velocity using a corresponding updated model.

13. The well system of claim 1, wherein the cable is located suspending from the tool string or coupled to an exterior of at least one of the first and second casings.

14. A method, comprising:

introducing a tool string into a wellbore, the wellbore at least partially lined with a first casing and a second casing concentrically overlapping a portion of the first casing, wherein a first annulus is defined between the first and second casings and filled with a first cement, and a second annulus is defined between the second casing and the wellbore and filled with a second cement;

obtaining wellbore data from a pulsed neutron sensor included in the tool string and optical fiber measurements from one or more optical fibers included in a cable positioned in the wellbore;

calculating a first distance of a flow path from the tool string and a first velocity of a water flow in the flow path using a pulsed neutron log borehole model and the wellbore data obtained from the pulsed neutron sensor, the flow path being located at a cement interface in the wellbore;

calculating a second distance of the flow path from the tool string and a second velocity of the water flow in the flow path using a distributed acoustic sensor (DAS) borehole model and distributed acoustic sensing measurements obtained from the one or more optical fibers;

calculating a third distance of the flow path from the tool string and a third velocity of the water flow in the flow path using a distributed Doppler sensor (DDS) borehole model and distributed Doppler sensing measurements obtained from the one or more optical fibers; and determining a width of the cement interface, a distance of the cement interface from the tool string, and a velocity of a water flow in the cement interface based on the second and third distances, and the first and second velocities.

15. The method of claim 14, further comprising:

comparing the first and second distances and the first and second velocities and thereby obtaining a first calculated distance of the flow path and a first calculated velocity of the water flow;

comparing the third distance with the first calculated distance to obtain a second calculated distance of the flow path and comparing the third velocity and the first calculated velocity to obtain a second calculated velocity of the water flow;

calculating a fourth distance of the flow path from the tool string and a fourth velocity of the water flow in the flow path using a distributed temperature sensor (DTS) borehole model and distributed temperature sensing measurements obtained from the one or more optical fibers; and determining the width of the cement interface, a distance of the cement interface from the tool string, and a velocity of the water flow in the cement interface by comparing the fourth distance with the second calculated distance and the fourth velocity with the second calculated velocity.

16. The method of claim 14, wherein obtaining wellbore data from the pulsed neutron sensor comprises at least one of obtaining travel times of gamma rays received by the pulsed neutron sensor and obtaining energy spectrum ratios of near counts and far counts of gamma rays received by the pulsed neutron sensor.

17. The method of claim 14, wherein obtaining the optical fiber measurements from the one or more optical fibers comprises one or more of obtaining amplitudes of noise signals detected by the one or more optical fibers from the wellbore, obtaining a frequency spectrum of the noise signals, obtaining a relative phase shift between the noise signals, obtaining frequency ratios of near and far noise signals, and obtaining power spectral density of the noise signals.

18. The method of claim 14, wherein obtaining optical fiber measurements from the one or more optical fibers comprises one or more of obtaining amplitude and frequency information of an acoustic wave as modified by the wellbore, and a Doppler frequency shift between an acoustic wave emitted into the wellbore and the modified acoustic wave.

19. The method of claim 15, wherein obtaining the optical fiber measurements from the one or more optical fibers comprises one or more of obtaining a temperature of the wellbore, obtaining a temperature gradient of the wellbore, and obtaining a derivative of a temperature profile of the wellbore.

20. The method of claim 14, further comprising:

updating at least one of the pulsed neutron log borehole model and the DAS borehole model when a difference between the first and second distances and a difference between the first and second velocities is greater than a predetermined value; and recalculating the first distance and the first velocity, and the second distance and the second velocity using a corresponding updated model.

21. The method of claim 15, further comprising:

updating one or more of the pulsed neutron log borehole model, the DAS borehole model, and the DDS borehole model when a difference between the first calculated distance and the third distance and a difference between the first calculated velocity and the third velocity is greater than a predetermined value; and recalculating the first distance and the first velocity, the second distance and the second velocity, and the third distance and the third velocity using a corresponding updated model.

22. The method of claim 15, further comprising:

updating one or more of the pulsed neutron log borehole model, the DAS borehole model, the DDS borehole model, and the DTS borehole model when a difference between the second calculated distance and the fourth distance and a difference between the second calculated velocity and the fourth velocity is greater than a predetermined value; and recalculating the first distance and the first velocity, the second distance and the second velocity, the third distance and the third velocity, and the fourth distance and the fourth velocity using a corresponding updated model.

23. The method of claim 15, further comprising obtaining the DTS borehole model from a static borehole model.

* * * * *